B. T. HEADLEY & M. C. BARD.
GLASS WORKING MACHINE.
APPLICATION FILED MAY 31, 1910.

1,017,870.

Patented Feb. 20, 1912.

B. T. HEADLEY & M. C. BARD.
GLASS WORKING MACHINE.
APPLICATION FILED MAY 31, 1910.

1,017,870.

Patented Feb. 20, 1912.

B. T. HEADLEY & M. C. BARD.
GLASS WORKING MACHINE.
APPLICATION FILED MAY 31, 1910.

1,017,870.

Patented Feb. 20, 1912.

Witnesses—
Wells A. Burrowes
Walter Chism Inventors
Benjamin T. Headley.
Mervin C. Bard.
by their Attorneys
Howson & Howson B. T. HEADLEY & M. C. BARD.
GLASS WORKING MACHINE.
APPLICATION FILED MAY 31, 1910.

1,017,870.

Patented Feb. 20, 1912.
8 SHEETS—SHEET 6.

Witnesses:
Wills A. Burrows
Walter Chism

Inventors:
Benjamin T. Headley.
Mervin C. Bard.
by their Attorneys
Howson & Howson

UNITED STATES PATENT OFFICE.

BENJAMIN T. HEADLEY AND MERVIN C. BARD, OF MILLVILLE, NEW JERSEY, ASSIGNORS TO MILLVILLE MACHINE COMPANY, OF MILLVILLE, NEW JERSEY, A CORPORATION OF NEW JERSEY.

GLASS-WORKING MACHINE.

1,017,870. Specification of Letters Patent. Patented Feb. 20, 1912.

Application filed May 31, 1910. Serial No. 564,205.

*To all whom it may concern:*

Be it known that we, BENJAMIN T. HEADLEY and MERVIN C. BARD, citizens of the United States, and residents of Millville, Cumberland county, New Jersey, have invented certain Improvements in Glass-Working Machines, of which the following is a specification.

Our invention relates to glass working machines, that is to say, machines organized to produce hollow ware, bottles and the like from molten glass by the aid of molds and pressing operations or combined pressing and blowing operations, which may be manually or automatically controlled.

The object of our invention is to provide means for automatically shearing or separating the glass on a gathering rod from that introduced into the mold of a glass working machine designed for pressing such glass or one that is designed to effect a blowing operation in addition to the pressing operation, as the case may be; to provide means for automatically removing the shearing mechanism from its point of work; such action being followed by the introduction of a plunger to press the glass in the blank or press mold preparatory to its introduction into the blow-mold, and to provide means for returning the shears to their working position, ready for further operation as soon as the table carrying the molds has carried the press mold with its pressed content away from the feed point and brought a fresh press mold into place, all of such operations, including the movement of the table carrying the molds; the insertion and withdrawal of the blank or press molds; the blowing operation, and all movements of the various elements comprising the glass working machine organized to produce hollow ware from molten glass being performed automatically following the action of the shearing device which is controlled by the operator.

Other features of our invention are more fully pointed out hereinafter, reference being had to the accompanying drawings, in which.

In the art of blowing hollow glassware by machinery, or of pressing the same, the glass is usually introduced into the mold by an operator, who gathers a portion of the same upon a rod that is subsequently introduced into the press or other mold of the machine. To separate the glass in the mold from that on the gathering rod, an assistant is usually stationed adjacent the machine with a pair of shears to effect such operation. This arrangement, however, is objectionable, besides the presence of two men adjacent a machine is awkward in view of the contracted space, and, of course, the presence of one means the reduction in the cost of labor. In our machine, the entire operation can be attended to by the man gathering the glass, who engages valve operating means with his rod when he desires to have the glass sheared, and this in turn after being restored to its normal position operates means to shift the shearing mechanism, to drop a head carrying a plunger for pressing of the glass within the molds, to retract such head, and to move the pressed blank to the blowing position; such latter action taking place substantially simultaneously with the restoration of the shearing device to its normal position over the mold next moved into position below the same, all of such work taking place automatically.

Figures 5, 6, 7, 10, 11, 25, 26, 27:
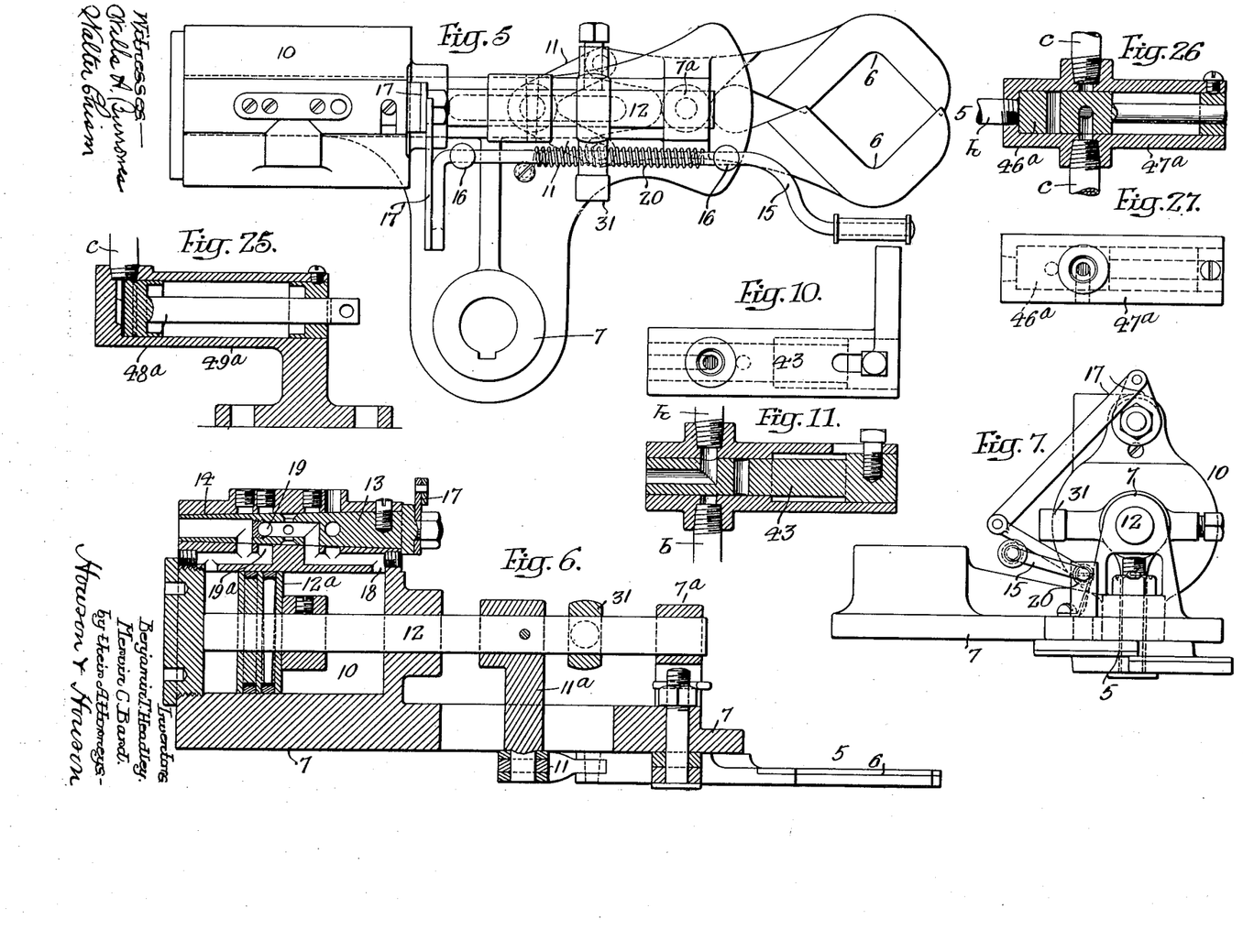
Fig. 5, is an enlarged plan view of the shears and operating mechanism therefor.
Fig. 6, is a sectional elevation of the cylinder and valve controlling the operation of the shears.
Fig. 7, is an end elevation of the cylinder and shears.
Fig. 10, is a side elevation of the valve structure operated by the turning movement of the shearing device.
Fig. 11, is a sectional plan view of the same.
Figs. 25 and 26, are sectional views of valves employed in said modified construction to control the press mold cylinder.
Fig. 27, is a side elevation of the structure shown in Fig. 26.
Figure 8:
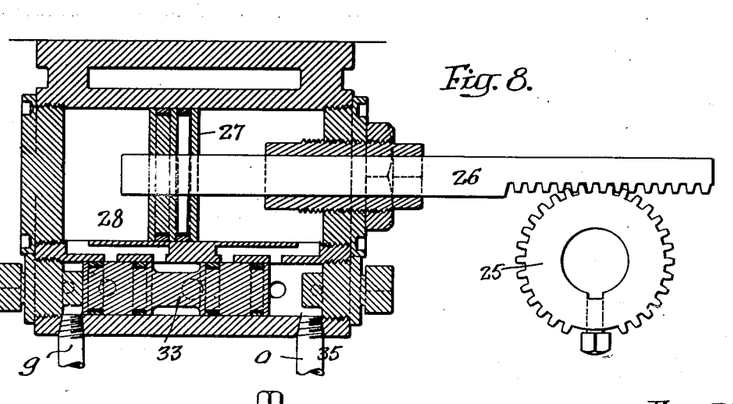
Fig. 8, is a sectional elevation of the mechanism for shifting the shears taken on the line *a—a*, Fig. 9.
Figure 9:
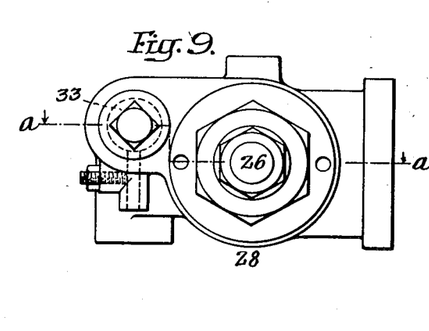
Fig. 9, is an end elevation of the same.
Figure 12:
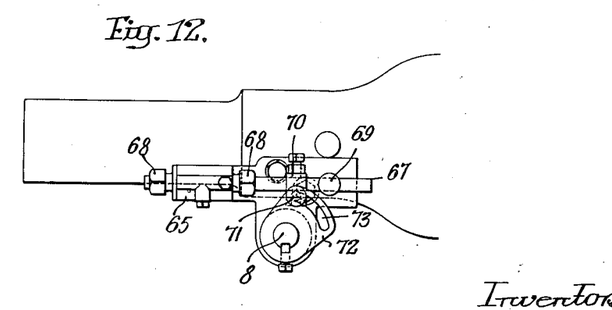
Fig. 12, is a plan view of dash pot mechanism for retarding the movement of the means for turning the shear structure.
Figures 13, 14:
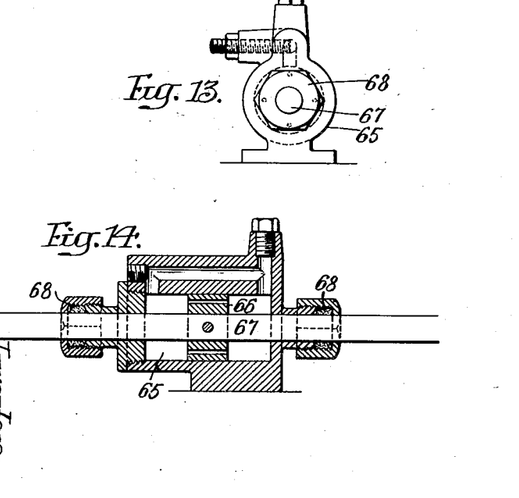
Fig. 13, is an end elevation of the same.
Fig. 14, is a sectional elevation of the same.
Figure 15:
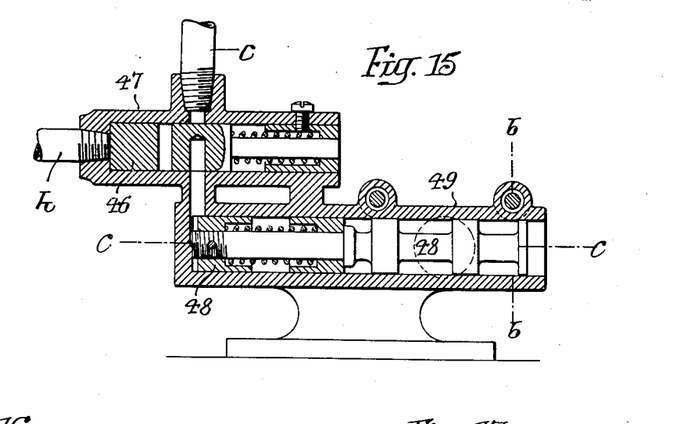
Fig. 15, is a sectional view of the valve structure controlling the operation of the press mold cylinder.
Figure 16:
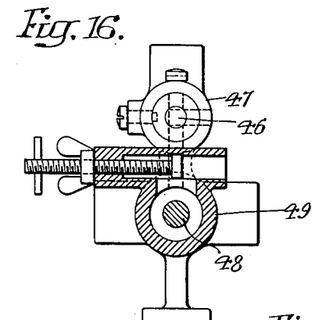
Fig. 16, is a sectional view on the line *b—b*, Fig. 15.
Figure 17:
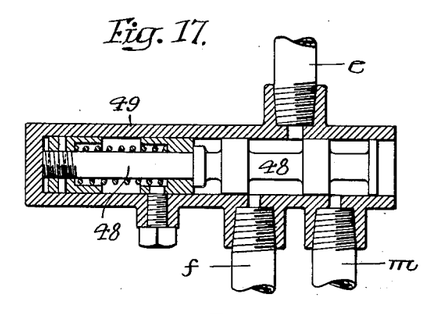
Fig. 17, is a sectional view on the line *c—c*, Fig. 15.

In the drawings, 1 represents the table of a glass blowing machine of usual type, such for instance as that disclosed in Patent No. 975,758, dated November 15, 1910. In the present instance, this table carries a series of blow-molds 2, having movable bottoms 3, and below the table a series of blank or press-molds 4 are disposed which are operated or controlled in proper correlation with the blow-molds so as to be positioned within the same when one of the latter is in line with the plunger of the pressing mechanism, ready to receive a charge of glass. The shears, comprising blades 5 with V-shaped notches 6 in the same, providing an opening large enough for the insertion of the glass are pivotally mounted on a bracket 7 carried by a vertical shaft or spindle 8 together with the operating mechanism; such shaft being movable so as to carry such mechanism out of the way at the proper time to permit the lowering of a plunger 9 into the glass within the press mold. The shear blades are pivoted on the under side of the bracket 7 which carries a cylinder 10, and are provided with toggle links 11 connected to an arm 11ª depending from a piston rod 12 carrying a piston 12ª within said cylinder, by means of which they are operated under the influence of fluid under pressure, preferably compressed air, introduced to said cylinder. The operation of the piston within said cylinder 10 is controlled by a valve 13 arranged to rotate in a seat 14 formed in the cylinder casing at the upper part of the same, as clearly shown in Fig. 6; said valve being movable to deliver motive fluid to the opposite ends of the cylinder to effect movement of the piston. To rotate this valve we provide a cranked rod 15 mounted in suitable bearings 16 and connected by means of toggle links 17 with the valve 13. The shears are normally open by reason of constant pressure engaging the forward face of the piston and entering via port 18 in the cylinder 10. The operator after delivering the charge of glass to the mold rests his rod upon this cranked element and presses down upon the same, and the pressure thereby exerted is sufficient to turn the valve, bringing a port 19 of said valve and a port 19ª of the cylinder in registry and permitting a flow of motive fluid behind the piston to operate the shear-blade toggle links and close the shears against the glass; severing the portion in the mold from that on the gathering rod. As soon as pressure of the rod is released from the cranked handle arranged for opening the valve, said handle may return to its normal position under the influence of a torsion spring 20. As soon as the charge of glass has entered into the mold, it is necessary that the same be pressed, an action effected by plungers 9 entering the mold at the top and serving to form the neck of the bottle or other article of hollow glassware, by forcing the glass into annular grooves in the upper portion of the blow-mold, in the manner indicated in the patent application referred to, or of finishing the article in the case of pressed ware.

The plungers are carried by a frame 21 vertically guided on rods 22 carried by the frame of the machine, and in order to permit the plunger frame to descend so that the plungers may be introduced into the mold, it is necessary to move the shearing device out of the way, and this is accomplished in the following manner: As noted, the shearing mechanism is carried by a vertical shaft 8 suitably journaled in brackets carried by the frame of the machine and it may be moved substantially a quarter turn to carry the shearing mechanism away from its point of operation over the mold to this extent. This is accomplished in the following manner: The shaft 8 is provided with a pinion 25 engaging a rack rod 26 carried by a piston 27 disposed in a cylinder 28, to which motive fluid is directed as soon as the shearing action is over and the shears have been released and started to open. This cylinder 28 is carried by the frame of the machine and under normal conditions constant pressure is directed against the rear of its piston to hold the rack rod in the forward position and maintain the shears in operative position over the mold. To introduce motive fluid to this cylinder at the forward side of the piston, we provide a valve 29 that is actuated by a trip 30 carried by a bracket 30ª on the shaft 8 supporting the shear operating means. This trip is free to move in one direction so that when the piston controlling the movement of the shears goes forward to close the same, a projection 31 on the piston rod merely moves the trip out of the way, ready for engagement therewith upon the return movement of the piston after the shears have done their work. The end of the piston rod is preferably guided in a post 7ª and as it returns and engages the trip the latter is brought into contact with a spring arm 32 underlying the valve 29; such contact raising the spring arm and simultaneously therewith the valve. The opening of the valve directs motive fluid to a reciprocating valve 33 disposed in a casing alongside the cylinder 28, which valve is normally in a position to deliver motive fluid to the rear side of the piston 27. When this valve is moved lengthwise motive fluid enters the front end of the cylinder 28 and operates the racked piston rod, which in turn being in engagement with the pinion carried by the shaft, moves the same, and the extent of such movement is approximately a quarter turn. Following this action, the press head is lowered, carrying a plunger 9 which enters the glass in the press mold and effects a preliminary pressing of the same, which includes the formation of the neck and the recessing of the body of the glass, subsequently augmented by the blowing operation to form a completed article.

When the shearing mechanism is moved the quarter turn, it trips suitable mechanism controlling the valve for operating the piston controlling the descent of the plunger. Following this operation, the table is moved a quarter turn so as to bring a fresh mold to the filling or feeding point and to carry the pressed blank to the blowing point. The shears must then be restored to an active position over the mold, and to accomplish this the following means are employed: To move the piston in the opposite direction and effect the turning of the gear by the racked piston rod, the cylinder 28 is provided with an inlet 35 for motive fluid, and this inlet is controlled by a valve 36, located beneath the table, and arranged to be actuated by a lever 37 pivoted at 38 to the frame of the machine and having an end 39 for contact with the stem of the valve; the opposite end of said lever lying in the path of a projection 40 carried by the table. This lever is also provided with a lateral projection which serves to prevent the raising of the same accidentally; thereby avoiding all danger of its being placed out of the operative position.

Motive fluid is admitted to cylinder controlling the shearing device, from a main air supply pipe 41 when the operator bears down on the cranked rod 15. The glass is then cut from the rod. As the piston rod carrying the shears is retracting to its normal position it operates means to open the trip valve 29, allowing motive fluid to pass to one end of the valve 33 for entrance to the cylinder 28 thereby actuating means for turning the shearing device out of the way, to permit the descent of the press head and the operation of one of the plungers.

While the shearing device is being moved to the inactive position a valve 43 is operated by a cam 44 on the shaft 8 carrying the shearing device so as to direct motive fluid to the under side of an equalizing valve 45 carried in a cylinder 45ª and to one end of a valve 46 to move the latter longitudinally in its shell 47 which action permits the passage of motive fluid to the shell 49, moving the valve 48 therein to bring the necessary ports into registry to permit the flow of motive fluid through said shell 49, and thence to the lower end of a cylinder 50, controlling the press molds to bring one of the latter into the pressing position. The equalizing valve 45 is raised to its uppermost position, bringing into registry the necessary ports providing for the passage of motive fluid to the upper end of a cylinder 51, to effect the lowering of the press-head carrying the plungers. The motive fluid passes from the valve 43 to the under side of the equalizing valve 45 and also through a valve 52, and from the latter it is directed by a suitable by-pass to the upper surface of the valve 45, and also to an auxiliary pressure cylinder 53. The pressure becoming greater on the upper surface of the valve 45 through the influence of pressure within the cylinder 53, overcoming the pressure on the under side of the valve, thereby causing the same to lower, bringing the necessary ports into registry to allow the motive fluid to exhaust from the upper end of the cylinder 51 while admitting air to the lower end of said cylinder, so as to raise the press head to its uppermost position and withdraw the plunger from the mold.

When the equalizing valve 45 cuts off the flow of motive fluid to the upper end of the cylinder 51 it also cuts off the passage of motive fluid to the valve 48 thereby permitting the motive fluid to exhaust from the lower end of the cylinder 50 while admitting motive fluid to the upper end of said cylinder to return the press mold to its lower position. On returning to its lower position, the press mold operates a valve 55, (shown in dotted lines) whereby motive fluid may pass to the table operating cylinder 56 to give the table a quarter turn; bringing an empty mold into position under the plunger. (This is fully described in Patent No. 975758, before referred to.) On the turning movement of the table it operates a trip valve 36 which causes motive fluid to pass to the opposite end of the valve 33, permitting movement of the shearing device so as to return the same to its normal position. Simultaneously therewith, the valve 43 returns to its normal position by the release of the cam 44 cutting off the passage of motive fluid to the equalizing valve 45, and allowing it to move to its lower position.

Figure 18:
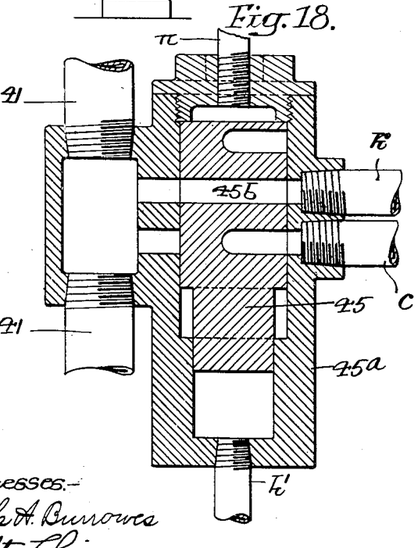
Figs. 18 and 19, are sectional views of an equalizing valve and its cylinder, according to our improved construction.
Figure 19:
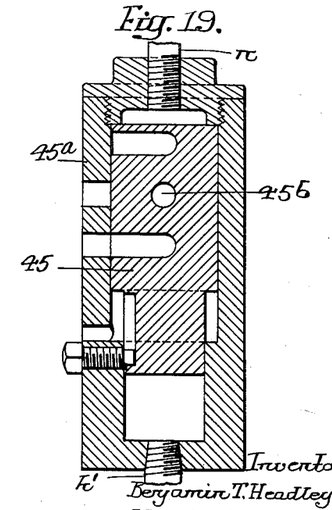
Figure 20:
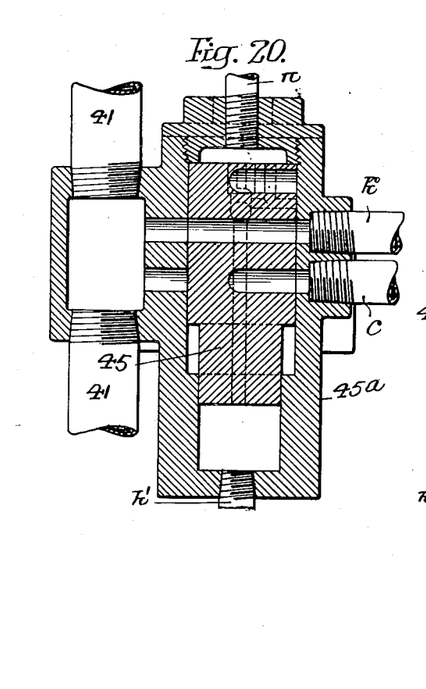
Figs. 20 and 21, are similar sectional views illustrating a modified construction of the same employed in connection with the modified structure shown in Fig. 4.
Figure 21:
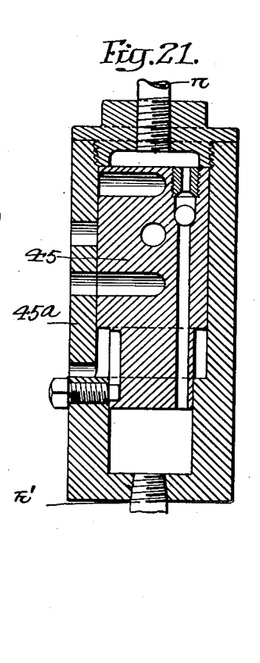

The equalizing valve structure controlling the operation of the press head is illustrated in section in Figs. 18 and 19; Fig. 19 being a section at right angles to Fig. 18. This structure and its operation is substantially the same as that disclosed in the Fredrick Patent, No. 858,592, and illustrated in Figs. 2 and 3 of the same. When the shaft 8 is moved to turn the shears out of the way of the press head, the cam 44 on said shaft engages a valve 43 shown in detail in Figs. 10 and 11, which causes the delivery of motive fluid to the equalizing valve 45 disposed in a casing 46, which valve is thereby raised and opens ports permitting the delivery of motive fluid to the upper end of the cylinder 51 having a piston which carries the plunger head. The mechanism is timed to keep the plunger in the glass some few seconds; effecting a gradual and uniform cooling of the same and while the plunger is in this position the excess of pressure necessary to raise the valve 45 passes to an auxiliary cylinder 53 and when the presure in said chamber equals the pressure of the entering fluid it reacts against the upper end of said valve which has a larger area than the lower end against which the initial pressure is exerted, thereby overcoming such pressure and causing the valve 45 to lower. This shifting of the valve cuts off the flow of motive fluid to the upper end of the cylinder 51 permitting the same to exhaust therefrom and simultaneously admits motive fluid to the lower end of said cylinder so as to raise the plunger head.

Figure 1:
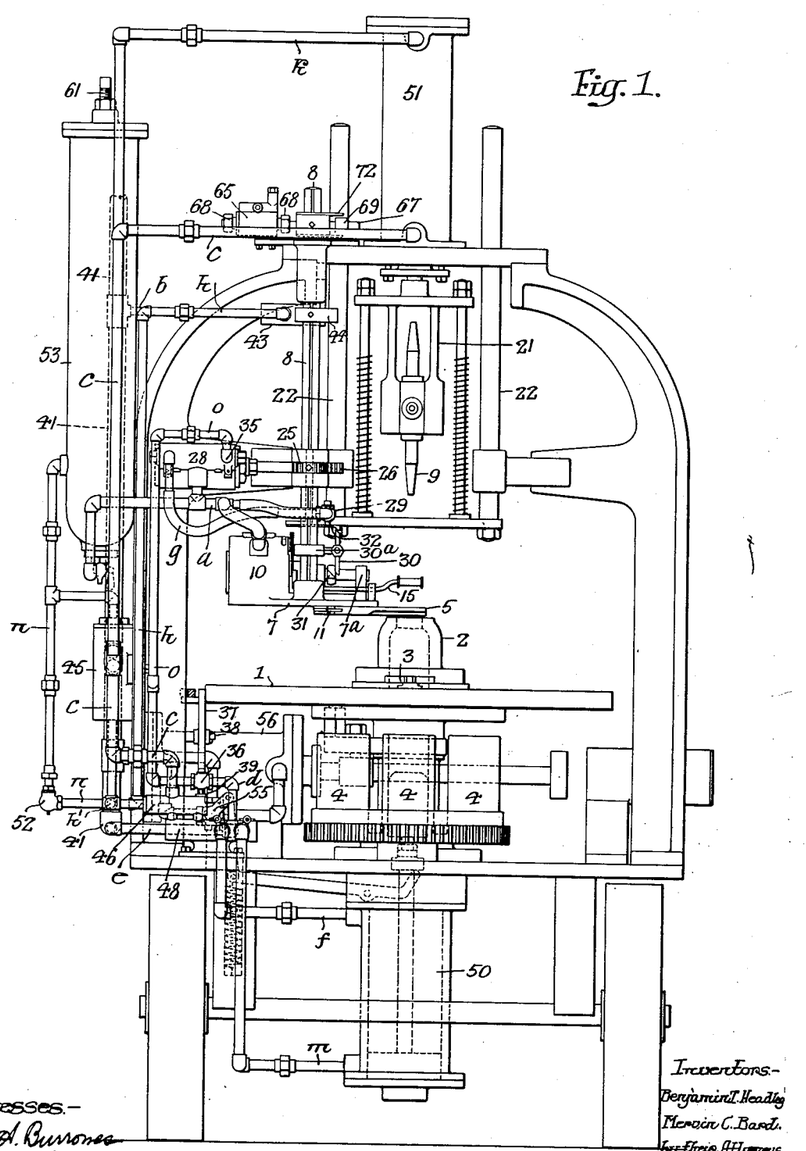
Figure 1, is a view in elevation of a glass working machine having mechanism embodying our invention; such machine being of the type designed to press and blow hollow glassware.
Figures 2, 23, 24:
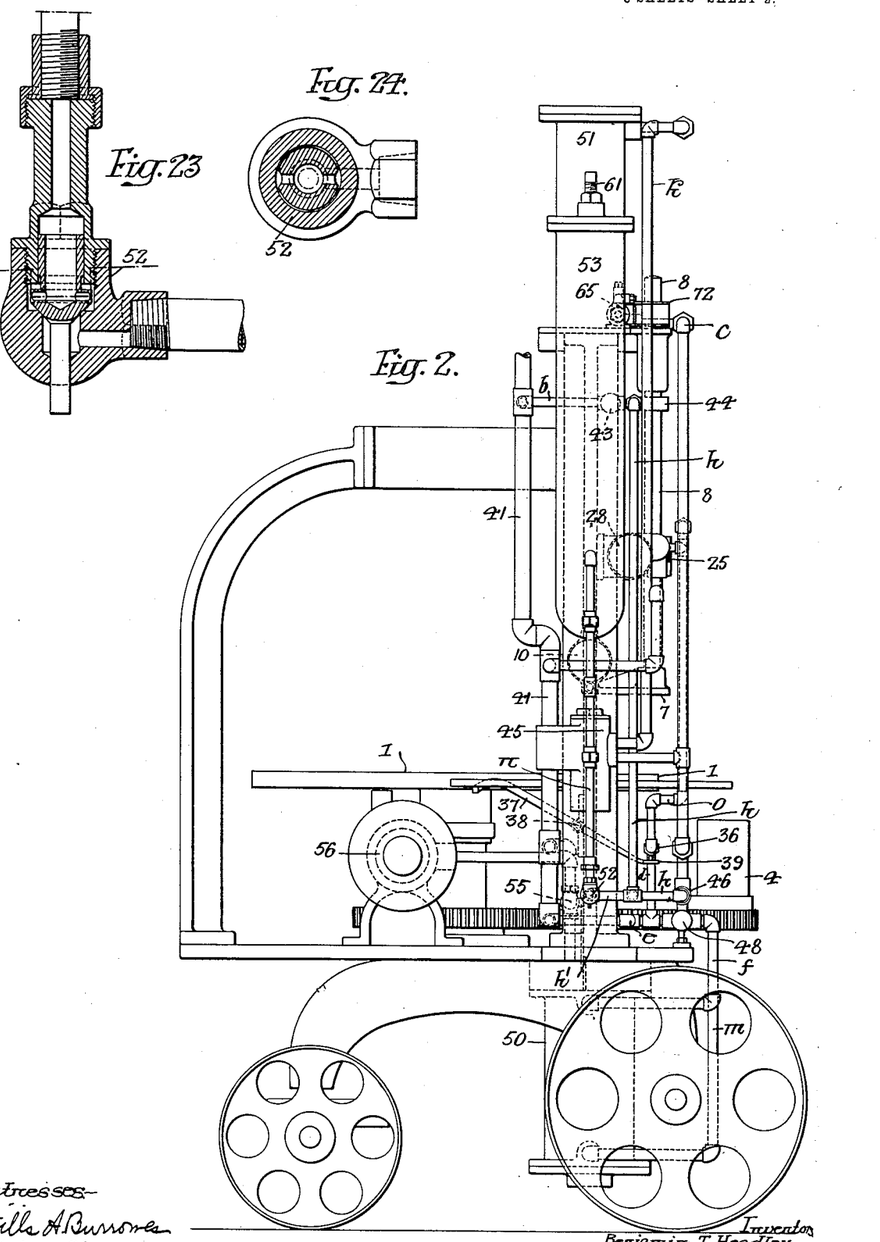
Fig. 2, is a side elevation.
Figs. 23 and 24, are sectional views of a valve controlling the flow of motive fluid to said cylinder.
Figures 3, 22:
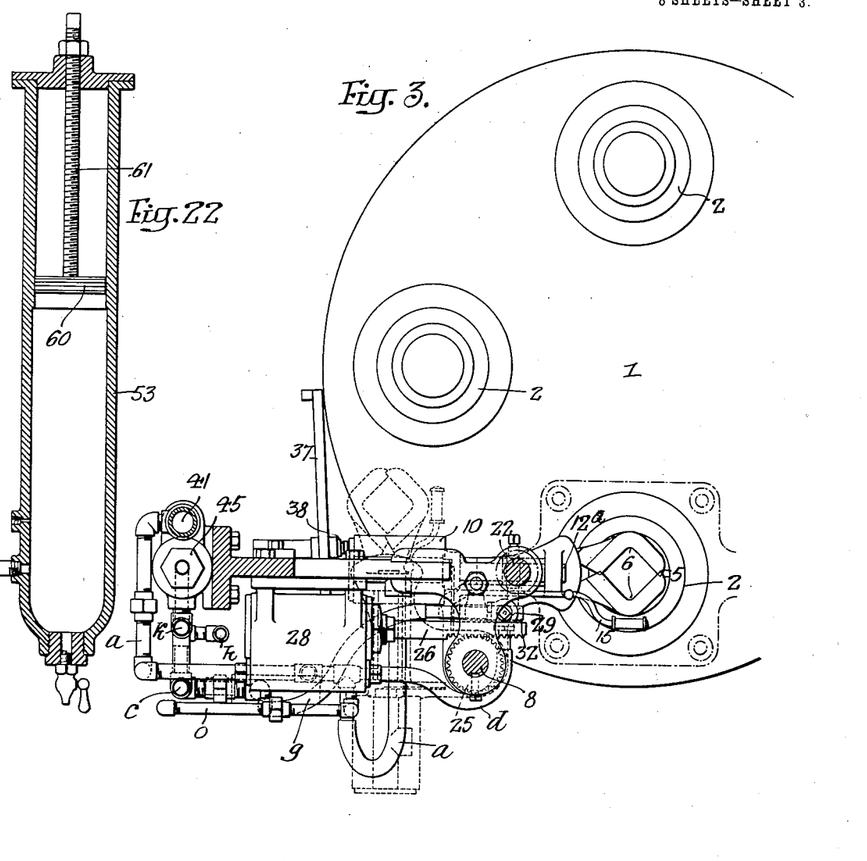
Fig. 3, is a plan view of the same on a slightly larger scale.
Fig. 22, is a sectional view of an auxiliary cylinder for motive fluid.
Figure 4:
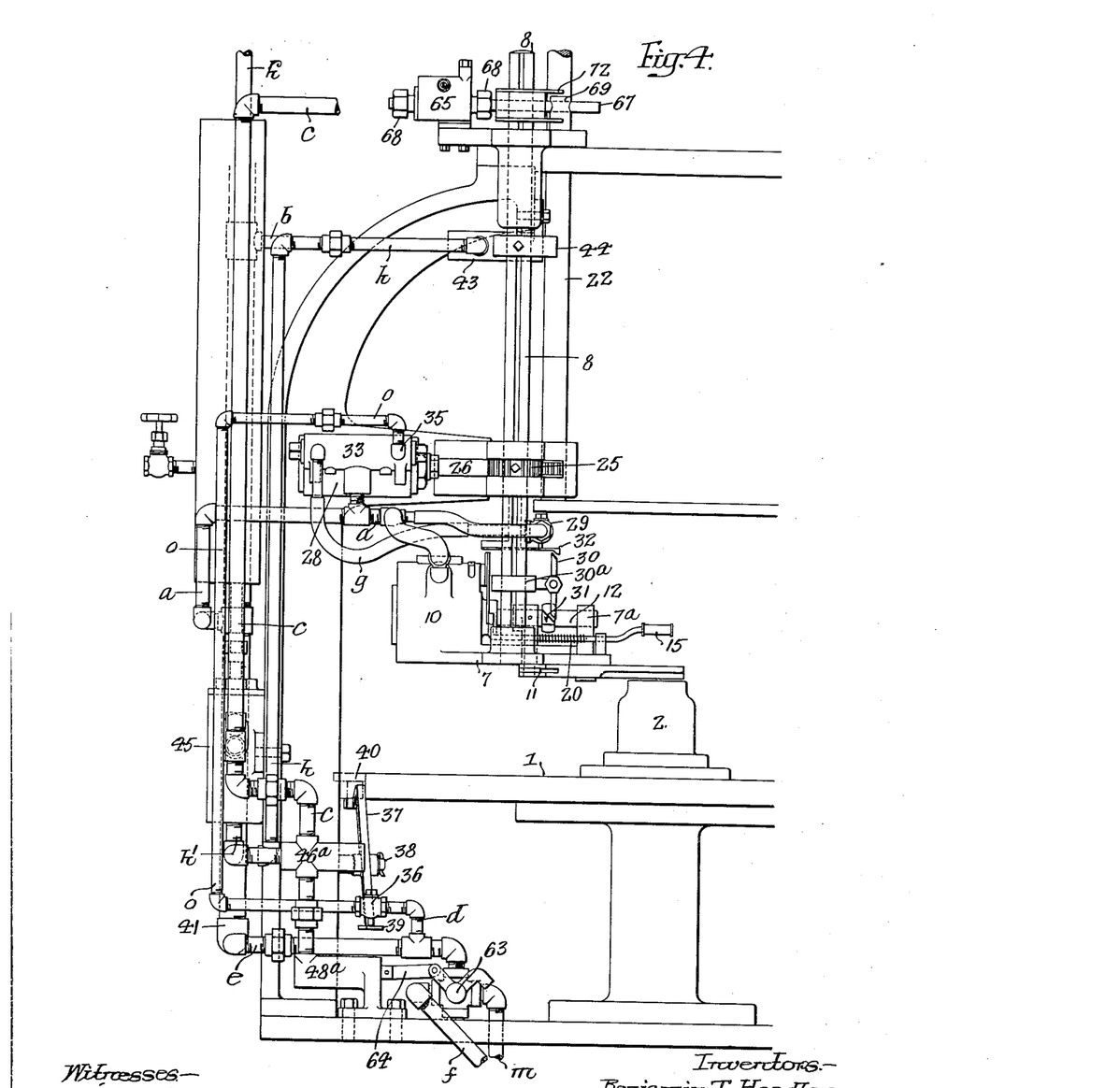
Fig. 4, is an elevation similar to Fig. 1, illustrating modified details of our invention.
Figures 28, 29:
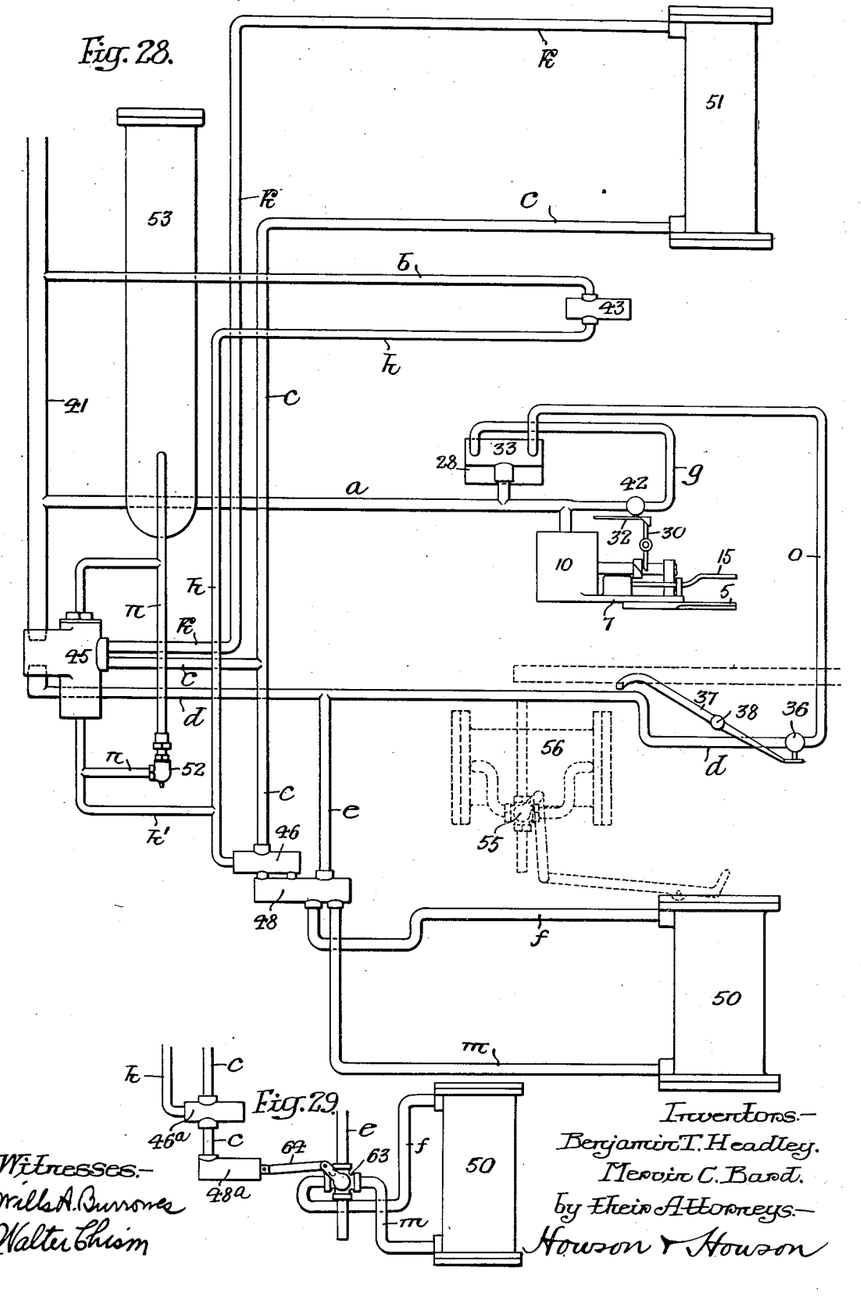
Fig. 28, is a diagrammatic view illustrating the various valves and operating portions of the mechanism forming the subject of our invention.
Fig. 29, is a fragment of the same illustrating the operation of the modification shown in Fig. 4.

The mechanism controlling the delivery of fluid under pressure, air, to effect the operation of the press head or plunger frame is substantially similar to that described in the Patent No. 858,592, for effecting the blowing operation, with the difference, however, that we are able to regulate the quantity of stored air to effect the return movement of the valve 45. To accomplish this, the cylinder 53 forming an auxiliary chamber and receiving motive fluid under pressure is provided with a piston or plunger 60 carried by a screw rod 61; such plunger being movable within the cylinder to increase or decrease the internal area of the cylinder as may be needed, depending upon the character of the work being done. We prefer to employ the construction shown in Figs. 1 and 2, and as illustrated in the main diagram Fig. 28, showing the use of the valves 46 and 48 in their shells 47 and 49; the valve 46 being shifted when the valve 43 is operated and such action in turn shifting the valve 48 so as to admit motive fluid to the cylinder 50 to raise the piston therein and with it the press mold. With this arrangement we employ the form of equalizing valve shown in Figs. 18 and 19, and the valve 52 through which motive fluid passes to the auxiliary cylinder 53. We may, however, employ the modified construction shown in Figs. 25, 26 and 27, and in the fragmentary diagram Fig. 29, in which a valve 46$^a$ is mounted in a shell 47$^a$ and when actuated by the movement of the valve 43 causes the operation of a valve 48$^a$ in a shell 49$^a$ which in turn moves a four way valve 63; being connected thereto by a link 64, whereby motive fluid may be directed to cylinder 50 to raise a press mold.

When the shearing means are thrown around to the inactive position, the movement of the same would cause a shock to the apparatus unless means were provided to guard against such shock. To obviate this, we provide retarding means which consists preferably of a fluid disposed in a suitable cylinder, the latter having a piston to move such fluid, which piston is connected to a suitable rod actuated by the shaft 8 which carries and turns the shearing mechanism. This retarding mechanism is shown at the top of the machine. Mounted upon the frame of the same is a cylinder 65 having a piston 66 carried by a piston rod 67 which is arranged to pass through stuffing boxes 68 at opposite ends of the cylinder, and within the latter a body of liquid is disposed, preferably a heavy viscous fluid, such as oil or mercury. To provide for substantially accurate longitudinal movement of the piston, the latter has its outer end guided in a standard 69. The piston carries a clamp 70, with a pin 71, and at the upper end of the shaft 8 an arm 72 is mounted, having a slot 73 for the passage of said pin. Upon the initial movement of the shearing mechanism to the new position, the arm will travel freely by reason of the slot in the same passing the pin 71, but when the rear end of such slot comes into contact with said pin, motion will be imparted to the piston rod 67 and, due to the heavy nature of the fluid, the movement of said rod will be materially retarded as the shearing means reach the end of their movement to the inactive position. The same means will provide for a slow stoppage of the shearing mechanism when it is restored to its normal position, since the piston 66 in the cylinder 65 by reason of the fluid being on both sides of the same will retain any position to which it is moved, and hence will be ready to retard the movement of the shaft 8 as the shearing means approach the end of their movement toward the active or normal position.

In the operation of our improved structure there is a constant supply of motive fluid in the pipe 41 after the valve controlling the passage from the source of supply is once opened, and motive fluid from said pipe passes via a pipe *a* to the valve 13 adjacent the cylinder 10 so that as soon as said valve 13 is turned by the operator engaging the cranked arm 15, motive fluid will enter the cylinder 10 to effect the operation of the shears. From the same pipe 41, constant pressure of motive fluid is maintained on the valve 43; entering via a pipe *b*, and such motive fluid passing through the valve 45 and a pipe *c* maintains the piston in the cylinder 51 in the upper position. The same pressure via pipes *d e* and *f* and valve 48, maintains the piston in the cylinder 50 in the lower position; the valve 45 being in its lower position with port 45$^b$ in registry with pipe *c*, and not in the position shown in Figs. 18 and 19. Following the operation of the shears, valve 42 is operated, and motive fluid is directed via pipe *g* to the valve 33 to shift the same in its casing, moving the piston 27 in the cylinder 28, which in turn moves the shaft 8 and shifts the shears. Said shaft 8 in its movement operates the valve 43, causing the passage of motive fluid from pipe *b* through said valve to the valves 45 and 46, through pipes *h* and *h'* which has the effect of raising the valve 45 in the casing 45$^a$ bringing the port 45$^b$ therein into registry with pipe *k* so that motive fluid can flow to the upper part of the cylinder 51, and simultaneously by operation of the valves 46 and 48 by motive fluid entering their casings via pipe *c*, the motive fluid in pipe *e* is diverted to a pipe *m* leading to the lower part of the cylinder 50 so as to raise the piston therein; the press mold being raised by the action of the piston in said cylinder as the plunger is brought down by the action of the piston in the cylinder 51. While this is taking place, the excessive pressure necessary to raise the valve 45 is passing to the auxiliary cylinder 53 via pipe *n*, and when the pressure within said chamber equalizes the pressure of incoming motive fluid it acts against the upper end of said valve 45, lowering the same, permitting exhaust from the various valves and cylinders, restoring the plunger to the normal upper position and the press mold to its lowered position. When the press mold lowers, it operates mechanism (shown by dotted lines) to shift the valve 55 controlling the operation of means for turning the table, and as the table moves the lever 37 is actuated to open the valve 36, permitting the flow of motive fluid from pipes *d* and *o* to the valve 33, moving the same to a position that will permit the entrance of motive fluid to the cylinder 28, which in turn operates the piston to turn shaft 8 and restore the shears to their normal position. The apparatus is then ready for the placing of a further charge of glass in one of the press molds, and upon the operator moving the crank arm 15 the shears will close, and the subsequent operations referred to will take place.

The essential feature of our invention is the placing of the shears directly over the mold at the charging point and the provision of means for the removal of said shears as soon as they have effected the severing of the glass to permit the lowering of the press plunger, for by this means we are able to insert said plunger with the glass at substantially the initial heat without danger of chilling the same which might be occasioned if the glass were moved from a charging position to a pressing position.

We claim

1. The combination with a glass working machine having molds for the reception of glass and means mounted above the same for pressing the glass in said molds, of shearing means for severing the glass charged to said molds, fluid controlled means for operating said shearing means, a movable mount carrying both of said means, and means for imparting movement to said mount in two directions whereby said shearing means and its operating means may be carried to and away from a mold.

2. The combination with a glass working machine having molds for the reception of glass and means mounted above the same for pressing the glass in said molds, of shearing means for severing the glass charged to said molds, fluid-controlled means for operating said shearing means, a vertical shaft carrying the shearing means and the operating means therefor, and means for imparting movement to said shaft whereby said shearing means and its operating means may be moved to and away from a mold.

3. The combination with a glass working machine having molds for the reception of glass, of means for rotating said molds, shearing means for the glass, operating means therefor, a vertical shaft disposed beyond the path of the molds and carrying the shearing means and the operating means therefor, and means for imparting limited movement to said shaft in two directions whereby said shearing means and its operating means may be bodily moved to the active and inactive positions with respect to a mold.

4. In a glass working machine, the combination with a mold table and a mold carried thereby and means mounted above the same for pressing the glass in said molds, of shearing means comprising a pair of pivoted blades movable to a position over said mold, a fluid controlled piston for actuating said blades, a bracket carrying said piston, a movable mount carrying said bracket and having limited rocking movement, and means for moving said mount whereby the shears, bracket and piston may be carried bodily to the active and inactive positions with respect to the mold, said mount moving in the arc of a circle eccentric to the arc through which the molds are moved.

5. In a glass working machine, the combination with a mold table and a mold carried thereby, of shearing means comprising a pair of pivoted blades, a fluid-controlled piston for actuating said blades, a bracket carrying said piston, a vertical shaft carrying said bracket and having limited rocking movement, and means for moving said shaft whereby the shears, bracket and piston may be carried bodily to the active and inactive positions with respect to the mold, said latter elements moving in the arc of a circle eccentric to the arc through which the molds are moved.

6. In a glass working machine, the combination with a rotatable mold table and a series of molds carried thereby, of shearing means for severing glass charged to said molds comprising a pair of pivoted blades, a piston for actuating said blades, a bracket carrying said piston, a vertical shaft carrying said bracket and having limited movement, means for putting the shearing means into action, and means operable upon the retraction of the same for moving said shaft whereby the shears, bracket and piston may be carried bodily to the active and inactive positions with respect to the mold.

7. The combination, in a glass working machine, of a frame and a vertical shaft carried thereby, shearing means carried by said vertical shaft, a pinion carried by said shaft, a cylinder, a piston in said cylinder, a racked piston rod carried by said piston, with its racked portion in engagement with said opening, and means for operating said piston to effect movement of the pinion by the rack whereby the shearing means may be moved away from a mold.

8. The combination, in a glass working machine, of a rotatable mold table, a mold carried thereby, a frame, a vertical shaft carried by said frame and having an axis of rotation beyond the path of the mold, shearing means carried by said shaft, means for moving said shaft to carry the shears away from the operative position, and fluid controlled means for retarding the movement of said shaft as it nears the end of its stroke.

9. A glass working machine including means for pressing and blowing glass placed in the mold, a cylinder for receiving a portion of the motive fluid, and means for varying the internal volume of said cylinder whereby a quantity of motive fluid necessary to operate certain portions of the machine may be measured in substantially definite amounts.

10. In a glass working machine, the combination with a mold table and molds carried thereby and means mounted above the same for pressing the glass in said molds, of means for shearing glass introduced into said molds comprising a pair of pivoted blades, means for actuating said blades including a fluid-controlled piston, a rotating valve controlling the supply of motive fluid to said piston, means for operating said valve, a shaft carrying said blades and their operating means, and means for imparting movement to said shaft to bodily move said blades and their actuating mechanism away from the mold, said blades and their actuating mechanism moving in the arc of a circle eccentric to the arc through which the molds are moved.

11. The combination, in a glass working machine, of a mold table and molds carried thereby means for rotating said table, shearing means for glass introduced into the mold, a stem movable in a plane beyond the axis of the table and carrying said shearing means, a fluid operating piston for operating the shears, a fluid operated piston for operating the stem, and automatically operated means for controlling the passage of fluid to the shears operating piston and the stem moving piston, said shears and their actuating mechanism moving in the arc of a circle eccentric to the arc through which the molds are moved.

12. In a glass working machine, the combination with a mold and mold table carried thereby, of shearing means comprising a pair of pivoted blades, a piston for actuating said blades, a bracket carrying said piston, means for moving said bracket and piston whereby the shears may be carried away from the mold, and means for actuating the shears shifting device upon the return movement of the piston for operating said shears.

13. The combination, in a glass working machine, of a frame, a vertical shaft carried thereby, shearing means carried by said vertical shaft, means for operating said shearing means, a pinion carried by said shaft, a cylinder, a piston in said cylinder, a racked piston rod carried by said piston, with its racked portion in engagement with said opening, and means for operating said piston to effect movement of the pinion by the rack whereby the shearing means may be moved away from the mold, a valve controlling the position of the piston having the racked piston rod, means for shifting said valve by motive fluid, and a valve for directing fluid to effect such shifting operated upon the retractive movement of the shears.

14. The combination, in a glass working machine, of a frame, a vertical shaft carried thereby, shearing means carried by said shaft, means for rotatably moving said shaft to carry the shears away from the operative position, an arm carried by said shaft, a piston rod disposed for engagement by said arm, a cylinder having a body of liquid, and a piston within said cylinder and connected to said piston rod for retarding the motion of said shaft as it approaches the limit of its movements.

15. A glass working machine including means for pressing and blowing glass placed in the mold, a cylinder for receiving a portion of the motive fluid, a piston within said cylinder for varying the internal volume of said cylinder whereby a quantity of motive fluid necessary to operate certain portions of the machine may be measured in substantially definite amounts, and means for adjusting said piston.

16. In a glass working machine, the combination of a mold table and molds carried thereby, a press mold, of means for shearing glass introduced into said molds comprising a pair of pivoted blades, means for actuating said blades including a piston, a rotating valve controlling the supply of motive fluid to said piston, means for bodily moving said blades and their actuating mechanism away from the mold, and means actuated by the movement of said shearing mechanism to raise the press mold.

17. The combination, in a glass working machine, of a mold table and molds carried thereby, means for rotating said table, shearing means for glass introduced into the mold, a movable stem carrying said shearing means, a fluid operated piston for operating the shears, a fluid operated piston for rotating said stem, a valve controlling the movement of the press mold, and a cam on said stem for operating said valve.

18. In a glass working machine, the combination with a mold and mold table carried thereby, a press mold, of shearing means comprising a pair of pivoted blades, means for actuating said shears, means for shifting the same, and means actuated by the shifting device to raise the press mold.

19. The combination, in a glass working machine, of a frame, a vertical shaft carried thereby, shearing means carried by said shaft, means for moving said shaft to carry the shears away from the operative position, a plunger frame, fluid actuated means controlling the movement of the same, a valve controlling the direction of motive fluid to said means, and a cam on said shaft for actuating said valve when the shaft turns.

20. The combination, in a glass working machine, of a frame, a vertical shaft carried thereby, shearing means carried by said shaft, means for moving said shaft to carry the shears away from the operative position, a plunger frame, fluid actuated means controlling the movement of the same, a press mold, fluid actuated means controlling the movement of the same, a valve controlling the direction of motive fluid to the several means for actuating the plunger frame and the press mold, and a cam on said shaft for actuating said valve when the shaft turns.

21. The combination with a glass working machine having a rotatable table, and a mold carried thereby for the reception of a charge of glass and rotated therewith in a circular arc, of means for severing the charge from the supply, a support for said severing means movably mounted beyond the arc of rotation of said mold, and automatically operated means for swinging the severing means and its support bodily to and from the active position.

22. The combination with a glass working machine having a rotatable table, and a mold carried thereby for the reception of a charge of glass and rotated therewith in a circular arc, of a pair of pivoted blades for severing the charge from the supply, a shaft supporting the same and movably mounted beyond the arc of rotation of said mold, and automatically operated means for swinging the pivoted blades and their supporting shaft bodily to and away from the active position.

23. The combination of a glass working machine having a mold to receive a charge of glass, means for shearing this charge from the supply, means for shifting the shearing means, means for raising the mold into pressing position, means for lowering a plunger into the charge of glass within the press mold, means for shifting the mold, and means for returning the shearing device to its normal position, said several means being automatically operated after the action of the shearing means.

24. The combination of a glass working machine having a movable table, a mold carried thereby, a press mold to receive a charge of glass coacting with the mold carried by the table, fluid operated means for shearing this charge from the supply, means for shifting the shearing means, fluid operated means for raising the mold into pressing position, means for lowering a plunger into the charge of glass within the press mold when the latter is raised, means for lowering the mold, means for raising the plunger, means for shifting the table, and means for returning the shearing device to its normal position, said several means being automatically operated when the shears separate after the shearing action.

25. In a glass working machine, the combination of a casing, a valve therein, means for directing motive fluid under pressure to raise said valve, a cylinder in communication with one end of said valve and receiving a portion of said motive fluid whereby pressure upon the valve may be equalized, and means for varying the internal volume of said cylinder, the area of said valve in communication with the pressure in said cylinder being greater than that in communication with direct pressure whereby it may be shifted by the pressure in the cylinder after pressures upon the valve have been equalized.

In testimony whereof, we have signed our names to this specification, in the presence of two subscribing witnesses.

BENJAMIN T. HEADLEY.
MERVIN C. BARD.

Witnesses:
JOHN S. HORTON,
THOMAS WHITAKER.